United States Patent
Chu et al.

(10) Patent No.: US 6,341,750 B1
(45) Date of Patent: Jan. 29, 2002

(54) SPACECRAFT MOTION ESTIMATION USING A GIMBALLED MOMENTUM WHEEL

(75) Inventors: Peter Y. Chu, Pala Alto; John S. Higham, Mountain View, both of CA (US)

(73) Assignee: Space Systems/Loral, Inc., Palo Alto, CA (US)

( * ) Notice: Subject to any disclaimer, the term of this patent is extended or adjusted under 35 U.S.C. 154(b) by 0 days.

(21) Appl. No.: 09/563,566

(22) Filed: May 3, 2000

(51) Int. Cl.$^7$ ................................................ B64G 1/28
(52) U.S. Cl. ...................................... 244/165; 244/170
(58) Field of Search ................................ 244/164, 165, 244/171, 170; 701/13

(56) References Cited

U.S. PATENT DOCUMENTS

| | | | | |
|---|---|---|---|---|
| 3,493,194 A | * | 2/1970 | Kurzhals | 244/165 |
| 4,021,716 A | * | 5/1977 | Rue | 244/165 |
| 5,269,483 A | * | 12/1993 | Flament | 244/164 |
| 5,396,326 A | * | 3/1995 | Knobbe et al. | 33/321 |

* cited by examiner

*Primary Examiner*—Galen L. Barefoot
(74) *Attorney, Agent, or Firm*—Kenneth W. Float

(57) ABSTRACT

A method for estimating motion of a dual-spin spacecraft having a gimballed momentum wheel. The method disengages the gimbal from its drive train in anticipation of a short disturbance. Then, the gimbal slip resulting from the disturbance is measured. The method may be used to stabilize any dual-spin spacecraft that uses a gimballed momentum wheel. To stabilize the dual-spin spacecraft, the gimbal angle and gimbal rate are measured during and after the disturbance to provide an indication of the inertial spacecraft motion along gimbal axes. The magnitude and direction of the disturbance are determined by comparing motion of the gimbal before and after the disturbance. Then, torques are applied to the gimbal to counteract the spacecraft motion resulting from the disturbance. Temporarily reducing torque on the gimbal may be accomplished by disengaging the gimbal drive train, disengaging a holding mechanism between motor stator and rotor, or disabling command and back-emf torques, whether the drive is a DC motor or a stepper motor.

8 Claims, 1 Drawing Sheet

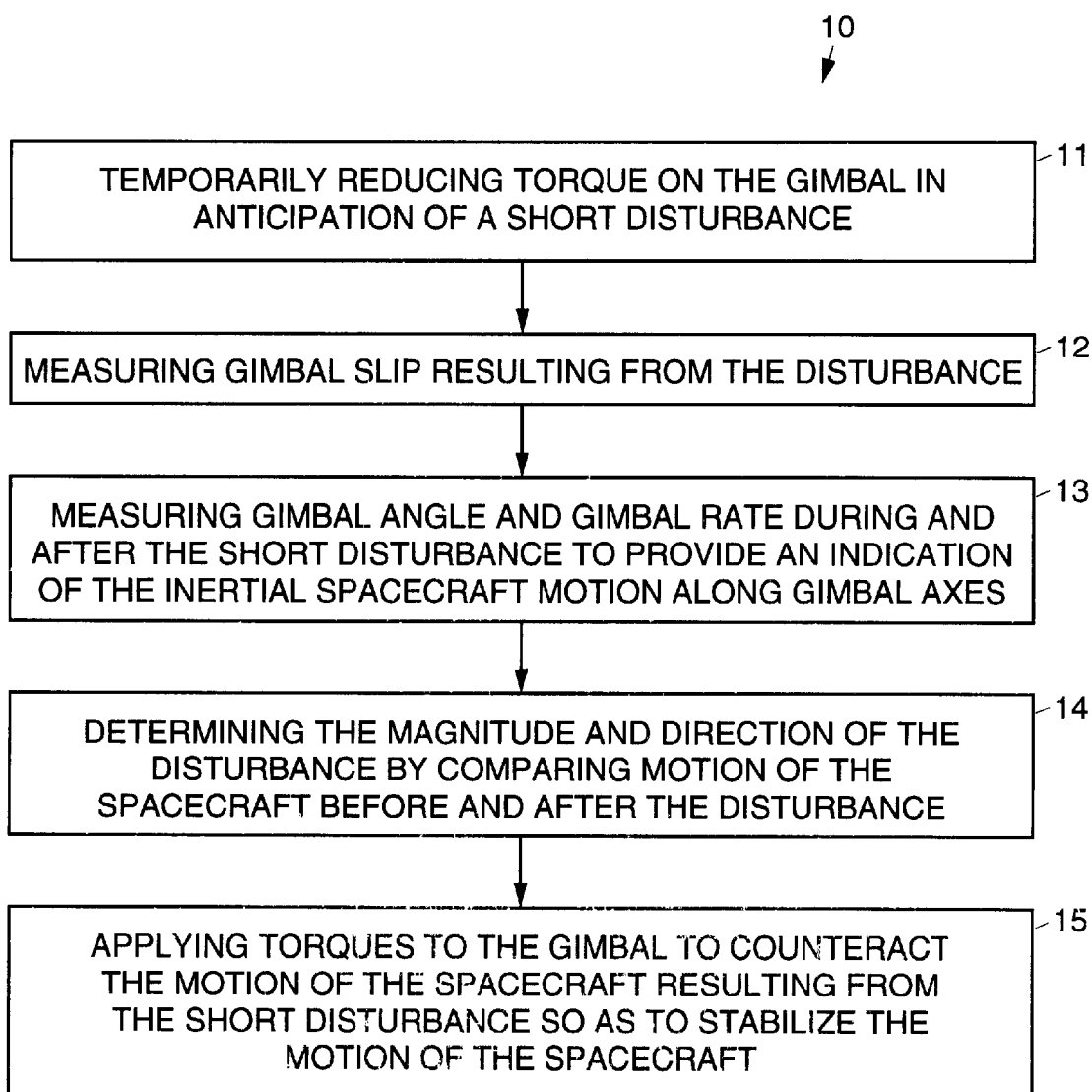

SPACECRAFT MOTION ESTIMATION USING A GIMBALLED MOMENTUM WHEEL

BACKGROUND

The present invention relates generally to dual-spin spacecraft, and more particularly, to methods for estimating the motion of a spacecraft comprising a gimballed momentum wheel and stabilizing the motion of the spacecraft.

Heretofore, on certain dual spin satellites manufactured by the assignee of the present invention, a velocity wheel momentum storage device was used in conjunction with a roll/yaw controller. The limitations of the currently used velocity wheel momentum storage device and roll/yaw controller are generally well known and have been documented by the assignee of the present invention. These limitations include performance and operation limitations such as no roll momentum storage/torque capability, necessity of feedforward processing to achieve acceptable performance, and large transients with complimentary long settling times as compared to the performance of the pitch controller.

The present invention involves stabilization of a dual-spin spacecraft that uses a gimballed momentum wheel. The concept of the present invention is to disengage the gimbal from the drive train in anticipation of a short disturbance, and measuring the gimbal slip resulting from the disturbance. A search was performed on the present invention and this teaching was not found in any of the patents uncovered in the search.

Regarding the patent search, U.S. Pat. No. 3,493,194 Kurzhals relates to double gimballed momentum wheels for stabilizing a spacecraft, wherein the gimbal positions are sensed and appropriate signals are generated. This reference does not disclose or suggest gimbal disengagement provided by the present invention.

The following patents generally relate to spacecraft stabilization using gimbal-mounted momentum wheels: U.S. Pat. No 3,813,067 issued to Mork, U.S. Pat. No. 4,052,654 issued to Kramer, U.S. Pat. No. 4,230,294 issued to Pistiner, U.S. Pat. No. 4,275,861 issued to Hubert, U.S. Pat. No. 4,911,385 issued to Agrawal, and U.S. Pat. No. 5,012,992 issued to Salvatore.

The following patents provide general background for the present invention: U.S. Pat. No. 3,003,356 issued to Nordsieck, U.S. Pat. No. 3,104,454 issued to Draper, U.S. Pat. No. 3,281,094 issued to Jasperson, U.S. Pat. No. 3,368, 777 issued to Boutin, U.S. Pat. No. 3,164,340 issued to Slater, U.S. Pat. No. 3,165,927 issued to Heath, U.S. Pat. No. 3,182,244 issued to Fitzrow, U.S. Pat. No. 3,188,019 issued to Boutin, U.S. Pat. No. 4,136,844 issued to Maudal, U.S. Pat. No. 4,143,312 issued to Duckworth. U.S. Pat. No. 4,418,306 issued to Samsel, and U.S. Pat. No. 4,723,735 issued to Eisenhaure Accordingly, it would be an advance in the art to have a method of estimating the motion of a dual-spin spacecraft and for stabilizing a dual-spin spacecraft in the presence of short disturbances. It would also be an advance in the art to have a method overcomes the limitation of the velocity wheel momentum storage device and roll/yaw controller discussed above, and other conventional methods disclosed in the above-cited patents. It is therefore an objective of the present invention to provide for methods for estimating the motion of a spacecraft comprising a gimballed momentum and stabilizing the motion of the spacecraft.

SUMMARY OF THE INVENTION

To accomplish the above and other objectives, the present invention comprises a method for estimating motion of a dual-spin spacecraft employing a gimballed momentum wheel. The method temporarily reduces torque on the gimbal in anticipation of a short disturbance. This may be accomplished by disengaging the gimbal drive train, disengaging a holding mechanism disposed between motor stator and rotor, or disabling command and back-emf torques if the drive is a DC motor or a stepper motor. Then, the gimbal slip resulting from the disturbance is measured. An example of an anticipated short disturbance is a thruster firing pulse which is initiated by the onboard computer or ground command.

The present invention may be used to stabilize a dual-spin spacecraft that uses a gimballed momentum wheel. The gimbal slips during the short disturbance event, leaving the momentum wheel inertially undisturbed. The gimbal angle and gimbal rate in each of the two gimbal axes are measured during and after the short disturbance to provide an indication of the inertial spacecraft motion along gimbal axes. Then, the magnitude and direction of the disturbance are determined by comparing motion of the spacecraft before and after the disturbance. Then, torques are applied to the gimbal to quickly counteract the spacecraft motion resulting from the short disturbance.

The final damping of the spacecraft residual inertial motion after the quick counteraction can use an earth sensor, a star sensor, and/or gyroscopes with one of the conventional methods. In this part of the spacecraft motion control, angle sensors that are part of gimballed momentum wheels are used only to damp relative gimbal motion. The control torques commanded by the quick counteraction and the final damping can be superimposed together.

The cost to implement the present invention is lower and its reliability is higher than the above-described conventional approach because separate gyroscopes are not needed. In fact the gimballed wheel and the gimbal angle sensors act like a two-axis gyroscope during gimbal slip. Noise and range are better than earth or star sensors because the present invention does not rely on external optical references. Yaw motion can also be sensed using the present invention, which is not available when using an earth sensor. Data processing is much simpler using the present invention than for a star sensor.

BRIEF DESCRIPTION OF THE DRAWINGS

The various features and advantages of the present invention may be more readily understood with reference to the following detailed description taken in conjunction with the accompanying drawing, wherein the sole drawing figure is a flow diagram that illustrates an exemplary method in accordance with the principles of the present invention for estimating spacecraft motion.

DETAILED DESCRIPTION

Referring to the drawing figure, it shows steps in an exemplary method 10 in accordance with the principles of the present invention which may be used to estimate motion of a dual spin spacecraft. The spacecraft includes a momentum wheel that is attached to a gimbal, a gimbal drive train which may include a locking mechanism, and a gimbal motor including a stator and rotor.

The limitations of the currently used velocity wheel momentum storage device and roll/yaw controller include performance and operation limitations such as no roll momentum storage/torque capability, necessity of feedforward processing to achieve acceptable performance, and large transients with complimentary long settling times. The assignee of the present invention has performed research to address these limitations. As a result of this research, it was concluded that a double gimballed momentum wheel provides for an optimum solution to overcome the limitations discussed in the Background section.

When using a double gimballed momentum wheel, the conventional roll/yaw control law is replaced with a control law that is compatible with the double gimballed momentum wheel. While investigating this new control law, a novel solution to the old problem of accurate yaw estimation was discovered. The realization of this discovery lies in how the double gimballed momentum wheel is mechanically configured. This form of yaw estimation is part of the control law that is used in conjunction with the double gimballed momentum wheel.

In practicing the present method 10, before a distinct disturbance event, such as a thruster pulse starts, for example, the locking torque on the gimbal is temporarily reduced 11 to (near) zero. This may be accomplished by disengaging the gimbal drive train, disengaging a holding mechanism between motor stator and rotor, or disabling command and back-emf torques if the drive is a DC motor or a stepper motor.

In order to stabilize the dual-spin spacecraft, the gimbal angle and gimbal rate are measured 13 during and after the short disturbance to provide an indication of the inertial spacecraft motion along gimbal axes. Then, the magnitude and direction of the disturbance are determined 14 by comparing gimbal angles and gimbal rates before and after the disturbance. Then, torques are applied 15 to the gimbal to counteract the spacecraft motion resulting from the short disturbance.

During the disturbance, the gimbal is free to slip and the spacecraft body is free to rotate around the momentum wheel which is inertially fixed. The gimbal angle and gimbal rate during and after the short disturbance provide an indication of inertial spacecraft motion along the axes of the gimbal. The magnitude and direction of the disturbance can be derived by comparing the motion (gimbal angle and gimbal rate) of the spacecraft before and after the disturbance. In a short period of continued gimbal measurement, the current spacecraft angle and rate are established. The gimbal drive can then revert to its normal configuration as a torque or position drive.

Thus, methods have been disclosed for estimating the motion of a spacecraft comprising a gimballed momentum and stabilizing the motion of the spacecraft. It is to be understood that the described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A method for estimating the motion of a dual-spin spacecraft comprising a momentum wheel attached to a gimbal, said method comprising the steps of:

temporarily reducing torque on the gimbal in anticipation of a short disturbance; and measuring gimbal slip resulting from the disturbance.

2. The method of claim 1 further comprising the steps of:

measuring gimbal angle and gimbal rate during and after the short disturbance to provide an indication of the inertial spacecraft motion along gimbal axes;

determining the magnitude and direction of the disturbance by comparing motion of the spacecraft before and after the disturbance; and applying torques to the gimbal to counteract the motion of the spacecraft resulting from the short disturbance so as to stabilize the motion of the spacecraft.

3. The method of claim 1 wherein the step of temporarily reducing torque on the gimbal comprises disengaging the gimbal from the drive train in anticipation of the short disturbance.

4. The method of claim 1 wherein the step of temporarily reducing torque on the gimbal comprises disengaging a holding mechanism disposed between a motor stator and rotor.

5. The method of claim 1 wherein the step of temporarily reducing torque on the gimbal comprises disabling command and back-emf torques applied to the gimbal.

6. The method of claim 1 wherein the step of measuring gimbal slip comprises disengaging the gimbal from the drive train in anticipation of the short disturbance.

7. The method of claim 1 wherein the step of measuring gimbal slip comprises disengaging a holding mechanism disposed between a motor stator and rotor.

8. The method of claim 1 wherein the step of measuring gimbal slip comprises disabling command and back-emf torques applied to the gimbal.

* * * * *